United States Patent [19]

Collins

[11] 4,453,383

[45] Jun. 12, 1984

[54] APPARATUS FOR AND METHOD OF UTILIZING SOLAR ENERGY

[76] Inventor: Wayne H. Collins, 337 Essex St., Kearny, Ariz. 85237

[21] Appl. No.: 287,195

[22] Filed: Jul. 27, 1981

[51] Int. Cl.³ .............................................. F03G 7/02
[52] U.S. Cl. ............................ 60/641.12; 60/641.14; 60/659; 98/50; 126/437
[58] Field of Search ............ 60/641.8, 641.11, 641.12, 60/641.14, 650, 682, 659; 98/50, 49; 126/437; 165/45

[56] References Cited

U.S. PATENT DOCUMENTS 4,106,295 8/1978 Wood ................................. 60/649

Primary Examiner—Allen M. Ostrager
Assistant Examiner—Stephen F. Husar

[57] ABSTRACT

The invention discloses an apparatus for generating electrical power using solar energy and an air mass rising from a mine shaft. The mine shaft has a generally inclined or vertical shaft, a shaft opening at approximately the ground level, and a lower end portion of the shaft includes an air inlet. A solar collector converts the sun's radiant energy into heat and heats a heat exchange or working fluid as it passes through the solar collector to increase its temperature.

12 Claims, 2 Drawing Figures

APPARATUS FOR AND METHOD OF UTILIZING SOLAR ENERGY

BACKGROUND OF THE INVENTION

1. Field of the Invention

This invention relates generally to the generation of useful power from a vertical or inclined shaft opening, and, more specifically, relates to inducement on demand of a draft in a vertical passage by the introduction of stored, collected solar energy into the passage for the generation of electrical power, ventilation or for other purposes.

2. Description of the Prior Art

In the past, man has quested for power from time immemorial. Of late, a clear understanding has developed concerning the advantage to be gained from reasoned application of power from a vertical or inclined shaft opening or passage, for the generation of electricity and innumerable other applications. Typical electrical generation facilities of the past have utilized fuel combustion or nuclear reactions to fire boilers which produced a mass flow driving a turbine whose output was coupled to the electrical generating unit. The problems associated with such facilities were well understood, including the limited fuel resource availability, the cost of fuels, the generation of atmospheric and water borne pollution, and the threat of nuclear contamination or catastrophe. A need existed for an alternate energy source, which did not present the threats of biotic destruction, and which preferably did not even require a consumable fuel.

Relatively recently, various types of alternate energy source-driven vertical or inclined opening, passage or shaft power generators have been developed. As evidenced by U.S. Pat. No. 401,516 to J. A. Robb on Apr. 16, 1889, it was known that chimney shaft power could be produced by installing a propeller or turbine in a chimney or stack.

Various approaches were developed to induce a draft in a shaft-like column to drive a turbine. In U.S. Pat. No. 3,894,393 to Phillip R. Carlson on July 15, 1975, a method of generating power by chilling air at an upper inlet of a column with evaporation to then generate electrical power with a turbine installed in the lower end of the column is disclosed.

In U.S. Pat. No. 4,106,295 to P. J. Wood on Aug. 15, 1978, it is disclosed that a combination of an evaporation process along with a solar water heater could be utilized to induce a draft in an insulated column to drive a generator installed in the column.

In U.S. Pat. No. 4,157,014 to R. W. Clark, Jr. on June 5, 1979, it is further disclosed that solar energy can be utilized to heat a liquid working fluid on a desert floor, which working fluid can be ducted toward a higher elevation, lower pressure region of the system therein to permit a power transfer device to extract shaft power from the flow. It is also there taught that the natural temperature differential existing between the ambient surface temperature inside an underground mine and the surface temperature outside the mine can be utilized to heat a working fluid, again causing an upward transport of the fluid which can be harnessed to produce substantially vertical or inclined mine shaft power.

A problem common to each of the solar energy power conversion systems of the past was that their output was limited to periods during which solar input was available.

Notwithstanding the developments of the past, a need continued to exist for a practical system to produce shaft power, which system was non-polluting, continuously available for power output, and which did not require a consumable fuel for continued operation.

SUMMARY OF THE INVENTION

In accordance with one embodiment of this invention, it is an object to provide a solar-powered electrical power generation system.

It is another object to provide a storage system for solar energy, to permit release of the stored energy to generate open mine shaft or open shaft power on demand.

It is a further object to provide a selectively operable solar-powered ventilation system for a mine.

It is yet another object to teach a method of generating electricity from solar energy on demand.

It is an object to teach a method of utilizing an inactive shaft or passage in an underground mine to store collected solar energy.

DESCRIPTION OF THE PREFERRED EMBODIMENT

In accordance with one embodiment of this invention, a demand-responsive solar-energized power generation system is disclosed, comprising: a mine having a generally vertical shaft open at an upper end to the atmosphere; the mine further having an air inlet to a lower end of the shaft; generator means for generating power in response to airflow through the shaft; solar collector means for heating a working fluid with solar energy; storage means for storing a quantity of the heated working fluid; and heat exchanger means for selectively inducing a draft in said shaft by heat transfer from the heated working fluid so that power can be generated thereby on demand.

In accordance with another embodiment of this invention, a method of generating electrical power on demand with solar energy is disclosed, comprising the steps of: heating a working fluid in a solar collector with solar energy; storing the heated working fluid in a shaft, passage or tunnel of an underground mine; inducing a draft in a shaft of the mine by drawing or rejecting heat from the heated working fluid to the air at a lower end of the shaft; and intercepting the draft with a flow responsive generator to thereby produce power on demand.

The foregoing and other objects, features and advantages will be apparent from the following, more detailed, description of the preferred embodiment of the invention, as illustrated in the accompanying drawings.

THE SPECIFICATION

Figure 1:
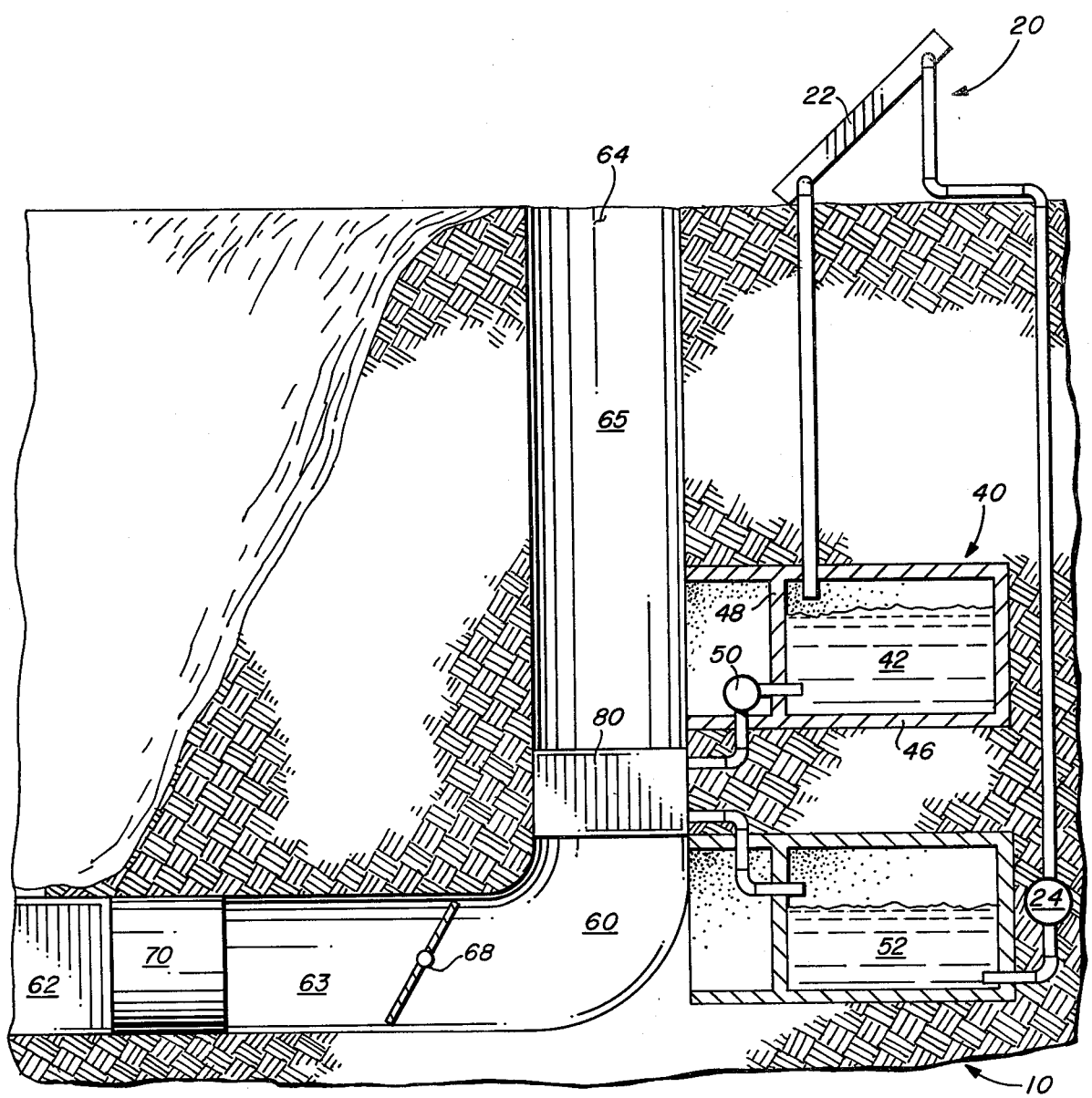
FIG. 1 is a sectional view of the herein disclosed power generation and storage system of the present invention.

Referring to FIG. 1, a sectional elevational view of a demand-responsive solar-energized electrical generating system is shown generally by reference number 10. The system 10 is essentially provided with a solar energy collection apparatus 20, a heat storage system 40, an air passage 60, a generator unit 70 situated to intercept an airflow passing through the air passage 60, a heat exchanger 80 positioned within the air passage 60, and a control system 100 (refer also to FIG. 2) for monitoring the power demand and correspondingly adjusting the rates of heat collection, storage and rejection to provide an electrical power output on demand.

The passage 60 has an air inlet 62 and a separate air outlet 64 so that a distinct pressure differential can be created between the inlet 62 and the outlet 64. A horizontal bore defining the inlet 62, and a connected vertical excavation defining the air outlet 64, could be dug specifically for use in the system 10, but an existing mine tunnel 63 and shaft, or raise, 65 are preferably utilized to reduce the initial capital cost of the installation. An elevational differential between the inlet 62 and the outlet 64 contributes to the operation of the system 10, by enhancing the induced pressure differential between the inlet 62 and the outlet 64.

The solar collection apparatus 20 has at least a collector 22 exposed to insolation. Although a conventional flat plate collector, having a working fluid output temperature in the range of 170° F. (77° C.) to about 190° F. (88° C.) is workable in the system 10, the preferred type of collector 22 is a solar concentrating type collector, having a working fluid output temperature in excess of 200° F. (93° C.). Boiling, and attendant problems, can be avoided even with such high collector output temperatures either by pressurizing the fluid system, or by utilizing a liquid working fluid, such as mercury, having a high boiling point.

A pressure pump 24, positioned on the inlet side of the collector 22, circulates the working fluid through the collector 22 to the heat storage system 40. The heat storage system 40 has a primary reservoir 42 which is shown as an inactive drift or tunnel of an existing mine. The reservoir 42 has impermeable walls to limit loss of the working fluid. Where the primary reservoir 42 is a tunnel in impermeable rock, no surface preparation is required, but where the reservoir 42 is a tunnel in porous rock, its surface must be sealed to limit and prevent loss of working fluid and heat.

As shown, the reservoir 42 may be lined with a concrete shell 46, and is sealed from the shaft 65 by a bulkhead 48. The reservoir 42 is coupled by valve 50 to the heat exchanger 80.

Opening the valve 50 allows heated fluid to flow from the primary reservoir 42 through the heat exchanger 80 to a secondary reservoir 52. As the heated fluid passes through the exchanger 80, heat is added to the air at the lower end of the shaft 65, causing expansion which results in an upward flow of the air from the lower end portion of the shaft having an air inlet to the open upper end of the vertical shaft and out the shaft opening 64. The secondary reservoir 52 permits the temperature differential between the fluid entering the heat exchanger 80 and the air entering the heat exchanger 80 to be maintained, by isolating the spent, cooled working fluid from the hotter fluid remaining in the primary reservoir 42.

The upward mass flow above the heat exchanger 80 causes a pressure differential across the heat exchanger 80, resulting in an airflow through the inlet 62 and through the power generating unit 70. The flow rotates a turbine or propeller in the electrical generating unit 70, allowing the power output of the electrical generating unit 70 to be controlled by the quantity of heat added by the heat exchanger 80 to the upward flow. A damper 68 is positioned in the tunnel 63 to allow the airflow through the passage 60 to be terminated or regulated as desired. The system 10 can also be selectively operated to ventilate, for example, a mine. The ventilating capacity can be maximized by eliminating the power generating unit 70.

By monitoring the temperature of the heated working fluid output of the solar collector 22, the temperature of the air entering the heat exchanger 80, the temperature of the collector working fluid stored in the primary reservoir 42, and the current demand for electrical power, the control system 100 operates the valve 50 and the pump 24 to add heat to the heat storage system 40 when possible, and also to induce a sufficiently large massflow to produce the desired power output as necessary by adding heat to the air in the shaft 65 via the heat exchanger 80. Heat is accumulated in the primary reservoir 42 by closing the valve 50, and driving the pump 24 to circulate the working fluid from the secondary reservoir 52 through the solar collector 22 and back to the primary reservoir 42. The heat required for electrical power generation is drawn from the thermal reserve in the primary reservoir 42.

Figure 2:
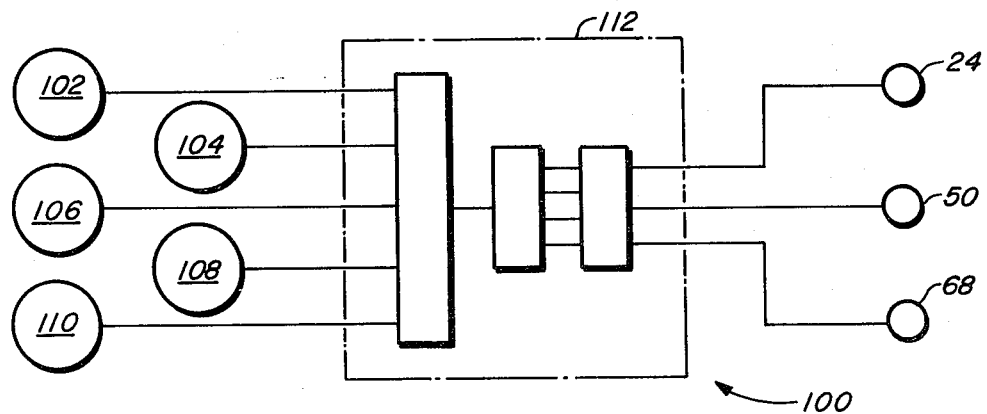
FIG. 2 is a block diagram of a control system of the herein disclosed power generation and storage system of FIG. 1.

Referring then to FIG. 2, a block diagram outlining the functions of the control system 100 of the generating system 10 is shown. The control system 100 includes a panel temperature sensor 102 to monitor the available temperature in the solar panel collector 22, a primary reservoir temperature sensor 104 and a secondary reservoir temperature sensor 106 to respectively monitor the temperature in each of the reservoirs 42, 52, an ambient air temperature sensor 108 to monitor the temperature of the air entering the heat exchanger 80, and a demand sensor 110 to monitor the current or present instantaneous electrical power demand. Each of the sensors 102, 104, 106, 108 and 110 provides a signal which is conducted to a logic network 112. The logic network 112 is in turn connected to the collector pump 24, the primary reservoir control valve 50 and to the damper 68, which in combination control the rate at which heat is stored in the primary reservoir 42 or rejected to the ambient air with the heat exchanger 80. Thus, the velocity of the air rising in the shaft 65 and the power output of the power generation unit 70 are also controlled by the control system 100.

While the invention has been particularly described and shown in reference to the preferred embodiment thereof, it will be understood by those skilled in the art that various changes modifications and variations in form and detail may be made therein with departing from the spirit and scope of the invention which is limited only by the appended claims.

What is claimed is:

1. The method of generating electrical power on demand with solar energy comprising the steps of:
   heating a working fluid in a solar collector with solar energy;
   storing said heated working fluid in a tunnel of an underground mine;
   inducing a draft in a shaft of said mine by rejecting heat from said heated working fluid to air at a lower end of said shaft; and
   intercepting said draft with a flow responsive generator to thereby produce electrical power.

2. The method in accord with claim 1, wherein said step of inducing a draft further including the steps of:
   sensing the demand for electrical power;

controlling the rate of rejection of heat from said working fluid to correspond to the current demand for power so that the generation of power is demand responsive.

3. The method of claim 2 wherein the step of heating a working fluid further includes the steps of:
measuring the temperature of said available working fluid in said solar collector; and
pumping said heat-depleted working fluid through said solar collector for heating said working fluid and returning the heated working fluid back to said fluid storage tunnel when said temperature of available working fluid at the solar collector exceeds a particular temperature.

4. The method of claim 3 further comprising the step of providing a damper to interrupt said draft on demand so that said step of intercepting said draft to generate power can be terminated on demand.

5. A method of ventilating a mine, comprising the steps of:
heating a working fluid in a solar collector with solar energy;
storing said heated working fluid in a tunnel of an underground mine;
inducing a draft in a shaft of said mine by rejecting heat from said heated working fluid to air at a lower end of said shaft; and
ducting fresh air through the location to be ventilated to a lower end of said shaft so that a ventilation flow is established.

6. A demand responsive solar power energy electrical generation system, comprising:
a mine having a generally vertical shaft open at an upper end to the atmosphere;
said mine further having an air inlet to a lower end portion of said shaft;
turbine-type means operably disposed in said lower end portion of said shaft between said air inlet and said generally vertical shaft and responsive to the passage of air therethrough as the air mass flows from said lower end portion to said open upper end of said vertical shaft for generating electrical power;
solar collector means having a working heat exchange fluid, said solar collector means for heating said working fluid utilizing solar energy for raising the temperature thereof;
storage means operably disposed underground and proximate said generally vertical shaft for storing a quantity of said solar energy-heated working fluid; and
heat exchanger means for selectively inducing a draft said generally vertical shaft by transfering heat from said heated working fluid stored in said storage means to the air mass from said inlet in the lower end portion of said shaft upwardly through said turbine-type means and rising in said generally vertical shaft to increase the airflow therein so that electrical power can be generated on demand by controlling the induced airflow through said turbine-type means.

7. A system in accord with claim 6 wherein:
said storage means including a primary reservoir for storing said solar heated working fluid;
said mine having at least a first tunnel portion; and
said first tunnel portion including said primary reservoir.

8. A system in accord with claim 7 wherein:
said storage means further comprising a secondary reservoir for storing cooler working fluid after passage through said heat exchanger means;
said mine further having at least a second tunnel portion; and
said second tunnel portion including said secondary reservoir.

9. A system in accord with claim 8 wherein said heat exchanger means including:
a heat exchanger mounted in a lower end of said generally vertical shaft;
inlet conduit means for conveying said working fluid from said primary reservoir to said heat exchanger;
outlet conduit means for conveying said cooler working fluid from said heat exchanger to said secondary reservoir; and
valve means for selectively terminating flow of said working fluid through said heat exchanger.

10. The system of claim 6 wherein said system includes a mine having said generally vertical shaft and said storage means includes first and said second tunnel portions within said mine, each of said first and second tunnel portions having impermeable walls, said first tunnel portion including means for storing said working fluid heated by said solar collector means to a first relatively high temperature and including means for feeding said heated working fluid stored in said first tunnel portion to said heat exchange means for transferring the heat stored in said working fluid to the air flowing in said generally vertical shaft for increasing the flow thereof and returning the relatively cooler working fluid to said second tunnel portion for separate storage therein prior to returning same to said solar energy collector for reheating.

11. The system of claim 9 wherein said solar collector means further includes pump means for transporting said cooler working fluid from said secondary reservoir back through said solar collector for reheating same and then back to said primary reservoir for storage until needed to further induce air flow within said shaft.

12. A system for generating electrical power utilizing an air mass rising from a mine shaft comprising:
a mine shaft having a generally vertical outlet portion, a lower end portion including an air inlet, and an intermediate portion;
a working fluid capable of serving as a heat transfer medium for absorbing and rejecting heat as required;
a solar collector means operably disposed above the surface of the mine for collecting the sun's radiant energy and converting same into heat for heating the heat-exchange fluid passing therethrough;
a first tunnel portion off of said vertical shaft for providing a primary storage reservoir for storing the heat exchange fluid from the solar collector means;
a second tunnel portion off of said vertical mine shaft for housing a secondary reservoir for storing the heat exchange fluid after the heat has been extracted or rejected therefrom;
a heat exchange means operably disposed in the intermediate portion of said mine shaft for receiving the heated heat-exchange fluid from said primary storage reservoir and rejecting the heat therefrom to heat the warm air mass rising in the vertical shaft and induce a draft therein for increasing the flow rate thereof and for returning the spent heat-exchange fluid after the heat has been rejected therefrom to said secondary reservoir and said second tunnel for storage prior to recirculation to said solar energy collector means;

a turbine-like means operably disposed in said lower portion of said mine shaft between said air inlet and said heat exchange means such that the air flow induced by heating the air rising through said heat exchange means draws the air mass through the turbine-like means with sufficient power to drive same and generate electrical power on demand;

circulation means for pumping the heat exchange fluid which has had the heat removed therefrom by said heat-exchange means back to said solar collector means for reheating and supplying the reheated heat-transfer fluid to the primary reservoir for storage until the heat exchange means requires additional heat for inducing air flow and hence generating electrical power upon demand; and control means including means for sensing temperatures and means for controlling the operation of said circulation means in response to said temperatures such that said heat exchange means and said turbine-like means controllably provide electrical power on demand.

* * * * *